(No Model.)

7 Sheets—Sheet 1.

A. M. HARRISON.
CASH REGISTER AND INDICATOR.

No. 412,611. Patented Oct. 8, 1889.

Witnesses:
Jas. E. Hutchinson.
Henry C. Hazard.

Inventor.
Alfred M. Harrison
by Pringle and Russell
his Attorneys (No Model.) 7 Sheets—Sheet 2.

A. M. HARRISON.
CASH REGISTER AND INDICATOR.

No. 412,611. Patented Oct. 8, 1889.

Witnesses:
Jas. E. Hutchinson.
Henry C. Hazard.

Inventor.
Alfred M. Harrison
by Pindle and Russell
his Attorneys (No Model.) 7 Sheets—Sheet 3.
A. M. HARRISON.
CASH REGISTER AND INDICATOR.

No. 412,611. Patented Oct. 8, 1889.

Witnesses:
Jas. E. Hutchinson.
Henry C. Hazard.

Inventor.
Alfred M. Harrison
by Pindle & Russell
his attorneys (No Model.)

A. M. HARRISON.
CASH REGISTER AND INDICATOR.

No. 412,611. 7 Sheets—Sheet 6. Patented Oct. 8, 1889.

(No Model.) 7 Sheets—Sheet 7.
A. M. HARRISON.
CASH REGISTER AND INDICATOR.
No. 412,611. Patented Oct. 8, 1889.
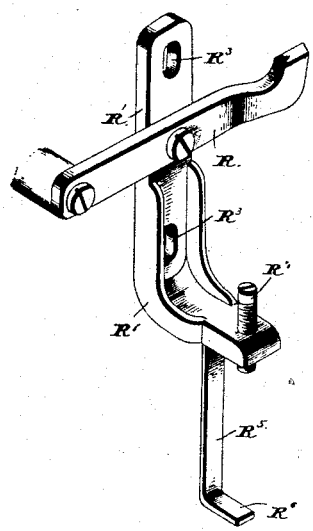
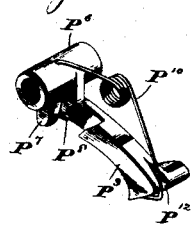
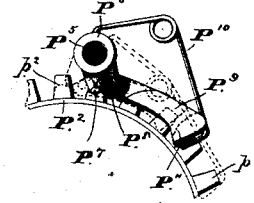

UNITED STATES PATENT OFFICE.

ALFRED M. HARRISON, OF DAYTON, ASSIGNOR TO JOHN F. PFEFFER, OF CINCINNATI, OHIO.

CASH REGISTER AND INDICATOR.

SPECIFICATION forming part of Letters Patent No. 412,611, dated October 8, 1889.

Application filed June 25, 1889. Serial No. 315,564. (No model.)

*To all whom it may concern:*

Be it known that I, ALFRED M. HARRISON, of Dayton, in the county of Montgomery, and in the State of Ohio, have invented certain new and useful Improvements in Cash Registers and Indicators; and I do hereby declare that the following is a full, clear, and exact description thereof, reference being had to the accompanying drawings, in which—

Figure 1:
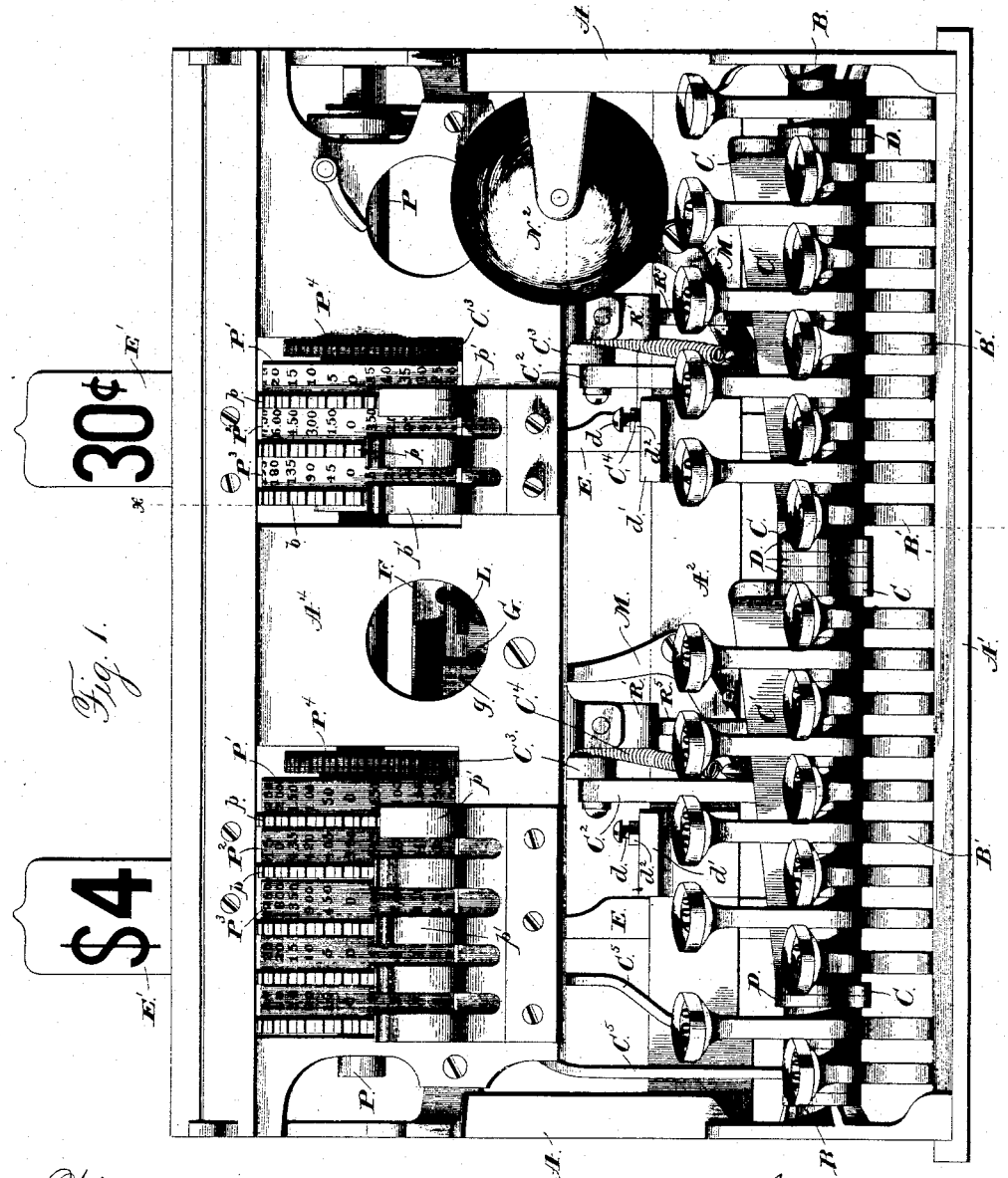
Figure 2:
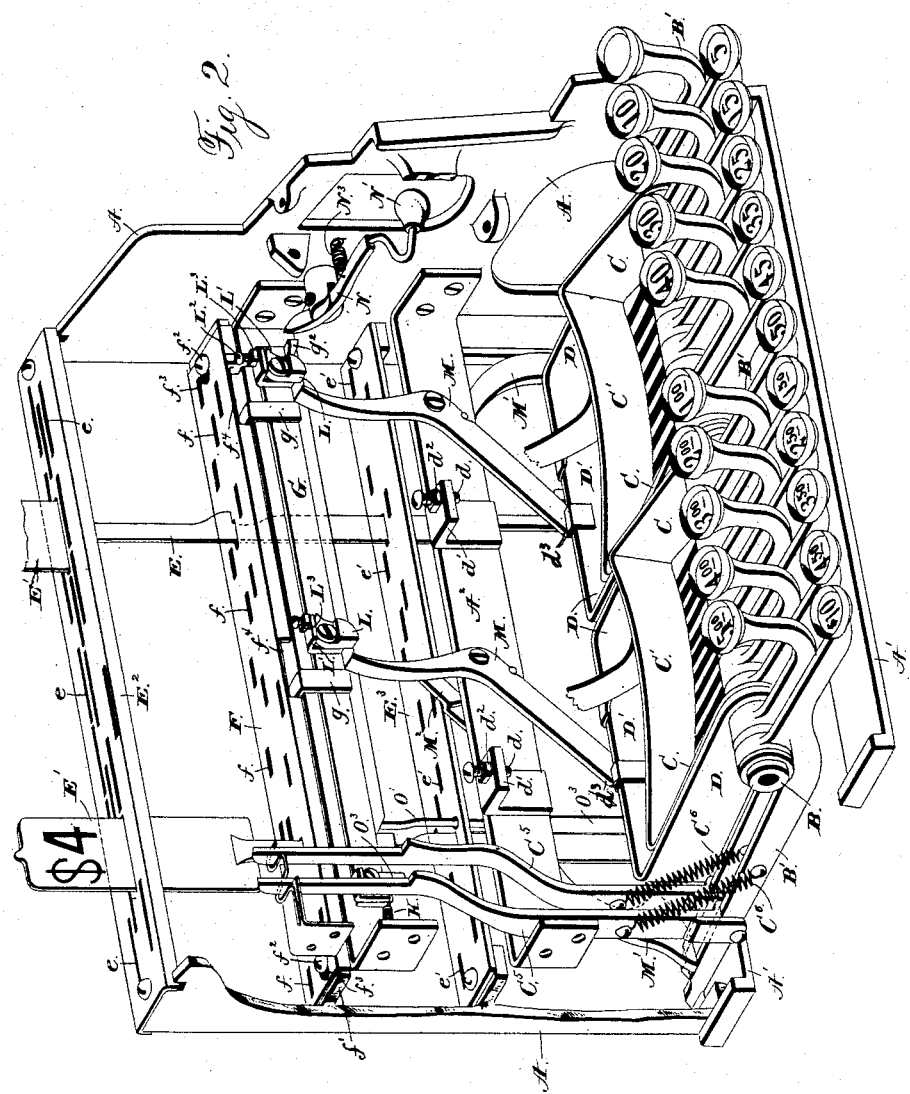
Figure 3:
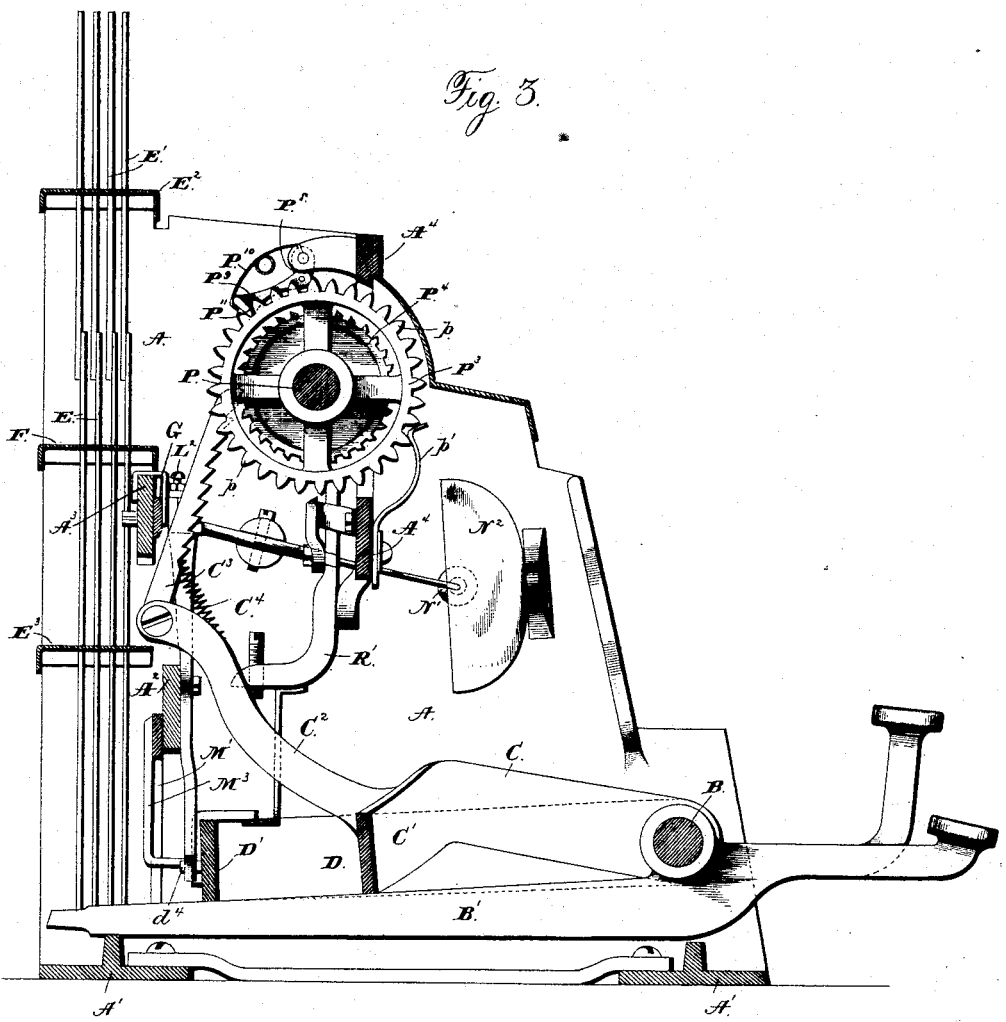
Figure 4:
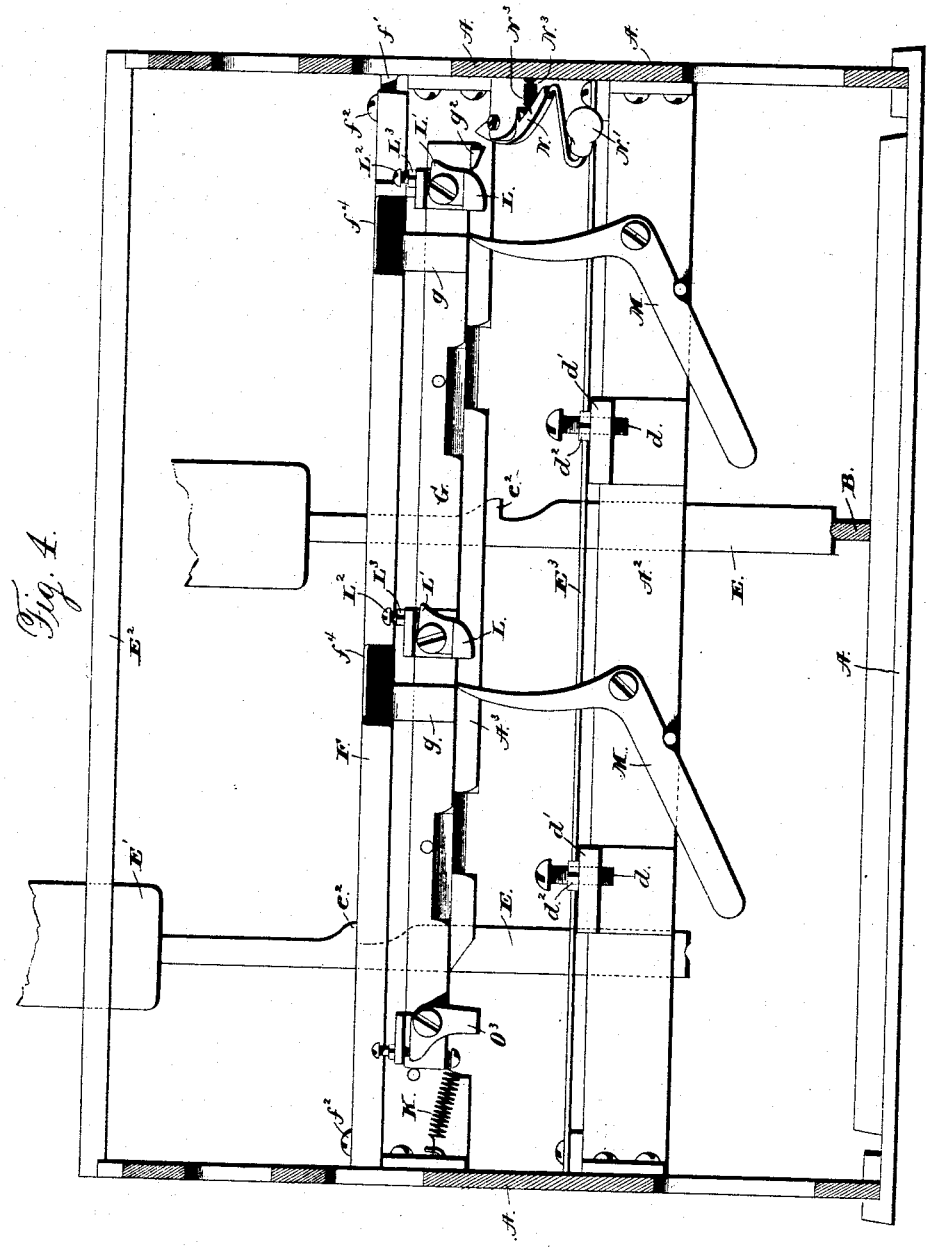
Figure 5:
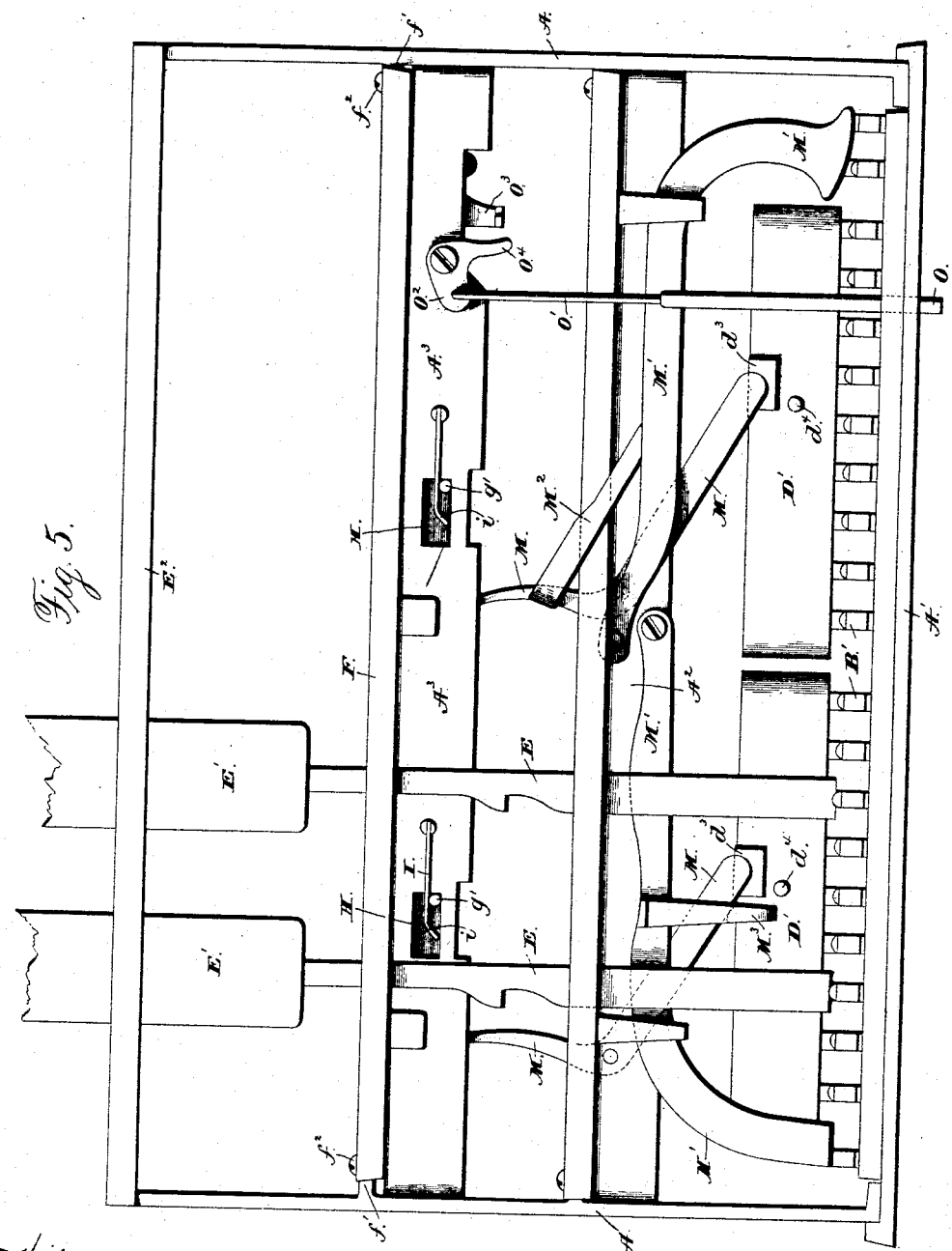
Figure 6:
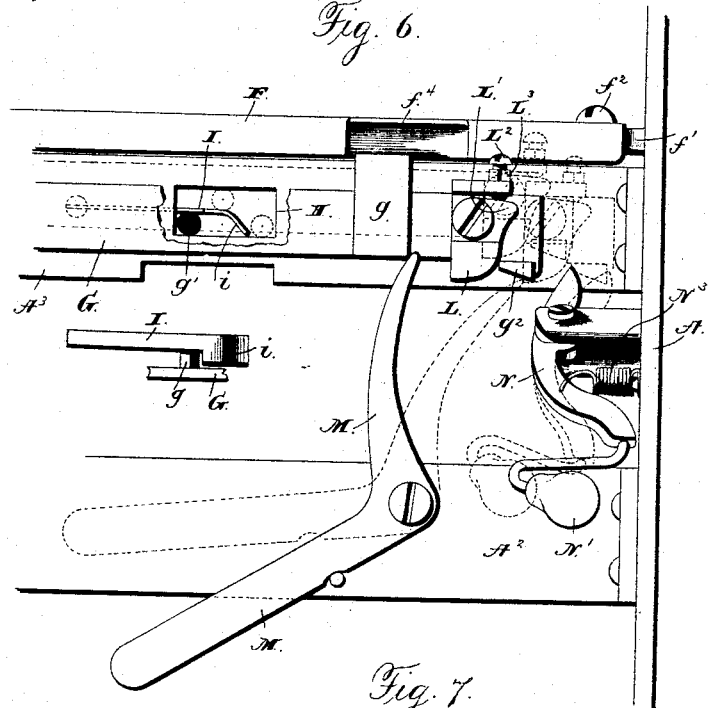
Figure 7:
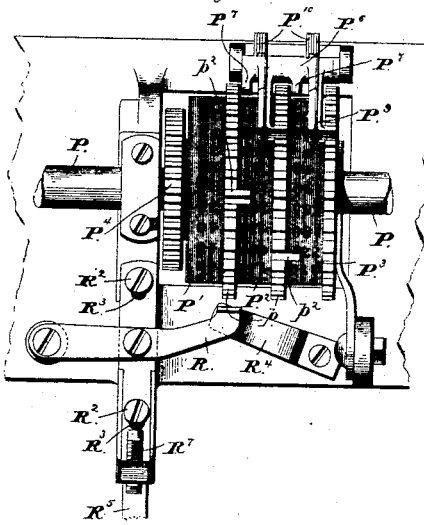

Figure 1 shows a view of my machine in front elevation; Fig. 2, a front perspective view of the same with the registering devices and their supporting-frame removed; Fig. 3, a section of the machine on line $xx$ of Fig. 1; Fig. 4, a view in front elevation, showing the indicator-rod locking and unlocking and the alarm-sounding mechanism; Fig. 5, a view of the same in rear elevation; Fig. 6, a detail front view showing the operation of the alarm-sounding mechanism; Fig. 7, a detail view showing the registering devices in rear elevation; Fig. 8, a detail perspective view of the brake for the register-wheels; Fig. 9, a detail perspective view of the carrying devices for carrying or continuing the registration from one wheel to another, and Fig. 10 a view of the same in side elevation.

Letters of like name and kind refer to like parts in each of the figures.

The object of my invention is to provide certain improvements in cash registering and indicating mechanism; and to this end my invention consists in the machine and in the construction, arrangement, and combination of the parts thereof, as hereinafter specified.

While I shall show and describe my mechanism as arranged in a cash register and indicator, it is adapted for use in whole or in part in various other machines—such, for instance, as registers and indicators for other things than cash, indicators or annunciators without registering mechanism, calculators, registers, recorders, and counting or measuring devices.

In the drawings, A A designate the upright side frame-plates, which are, as shown, of the same general form as those commonly used in cash registers and indicators. Such plates are, as usual, connected together at their bottoms or lower edges by the parallel transverse bars A' A'; also, connecting the two side plates A A near their rear edges are the two bars $A^2$ $A^3$, the latter situated above the other.

Supported at opposite ends in the forward portions of the side plates is the usual key-supporting shaft B, with the series of key-levers B' B', for actuating the indicating and registering mechanism, pivoted upon it. Such key-levers can be of any desired number and arrangement to suit the circumstances under which the machine is to be used and according to the kind of registrations and indications to be made. As shown, the entire series of keys arranged with the finger-pieces or plates in two banks is divided up into two sub-series, with a single key at its right end and two separately-acting keys at its left end. Extending across each sub-series is a swinging frame for actuating the registering devices, consisting of the two arms C C, pivoted to the shaft B at opposite ends of the respective sub-series, and the cross-bar C'. Such bar extending across the key-levers has its under edge so arranged with reference to the plane of the lever tops that the different levers as moved through the same distance will engage and move the frame different amounts. The difference between the movements of the frame by the different keys is made proportional to the difference in the amounts to be registered by the keys.

As I do not claim herein as my invention the arrangement of the frame cross-bars C', as shown in the drawings, I need not describe the same in detail. So far as my invention covered in the present case is concerned, the key-engaged frame can be of any form or construction adapted to be moved through different distances by the keys or key-levers. On each frame C C' C is an arm $C^2$, carrying a ratchet-toothed pawl $C^3$, for engaging the ratchet-wheels of the registering devices, to be described hereinafter. Attached to each pawl and the respective arm $C^2$ is a spring $C^4$, to hold the pawl in operative position in engagement with its ratchet-wheel. Each of the separate key-levers at the left of the machine has an upwardly-extending arm $C^5$, with a single tooth for engagement with ratchet-teeth on a separate register-wheel provided for the lever, as hereinafter more fully set forth. A spring $C^6$ for each arm serves to press such arm forward to bring its tooth into position to engage the teeth of the respective ratchet-wheel. The arms $C^5 C^5$, with their springs, form, then, spring-pressed register-actuating pawls like those on the swinging-frame arms $C^2 C^2$, except as to the number of teeth. For each sub-series of key-levers there is a second swinging frame consisting of the two pivotal arms D D, pivoted on shaft B just beyond or outside of arms C C of the respective register-actuating frame C C' C, and the transverse bar D', extending across and resting upon the key-levers of the sub-series when they are down in their normal positions. To limit the upward swing of these frames D D' D, I place on the stationary bar $A^2$ two stops—one for each frame—in position to be engaged by the cross-bar D' of such frame. These stops I prefer to make adjustable, being, as shown, in the form of set-screws $d$, tapped down through lugs $d'$ on bar $A^2$, and each locked as adjusted by means of a lock-nut $d^2$.

On the bar D' of each swinging frame can be placed, if desired, a bearing plate or piece $d^3$, to engage the respective stop. The lower key-engaging edge of such bar is parallel with the plane of the upper sides of the keys. Such edge will then, when the bar is stopped in its upward swing by its respective stop-screw $d$, stand across the paths of the keys in position to stop all of them at the same height, so that they are all limited to the same amount of swing as they are moved to actuate the respective register-operating frame C C' C.

On the rear side of each swinging frame-bar D' is a stud or pin $d^4$, for a purpose to be described hereinafter.

Resting upon the rear ends of the key-levers are the upright indicator-rods E—one for each key-lever—bearing on their upper ends the indicator plates or tablets E', for receiving the indicator marks or figures. For guiding these rods in their up and down movements I provide two guide-plates $E^2 E^3$— one above the other—extending horizontally across the machine and supported at their ends by the side frame-plates A A. The upper plate $E^2$ has a series of long slots $e$ $e$, adapted to receive and guide the tablets E' E', while the lower plate has correspondingly-arranged shorter slots $e'$ $e'$, to receive and steady the rods themselves. Upon each rod is a locking-shoulder $e^2$ of the ordinary kind, with inclined upper and abrupt under sides. Above the level of these locking-shoulders, when the rods are down in their normal positions, is the reciprocating locking-plate F, having slots $f f$, through which the rods pass, so arranged that as the plate is moved longitudinally in one direction the ends of the slots will be in the path of the rod-locking shoulders $e^2$ $e^2$. As shown, this locking-plate is at its end supported upon suitable lugs or brackets $f'$ $f'$ on the frame side plates A A, and is held in place and guided in its longitudinal movements by screws $f^2 f^2$ on such lugs or brackets engaging slots $f^3 f^3$ in its ends. The forward edge of plate F, which is just above the transverse frame-bar $A^3$, is bent or turned downward and provided with the two notches $f^4 f^4$. On the front of said frame-bar is a movable bar G, having two arms or lugs $g$ $g$ extending upward, then rearward over the upper edge of the frame-bar, and then down behind the latter. Such lugs or arms serve to hold the movable bar in place against the stationary bar, while leaving it free to move in a plane parallel with it. They also serve to actuate or move the indicator-rod-locking plate F into and out of its rod-locking position as the bar carrying them is reciprocated, as hereinafter fully described. With this latter purpose in view the lugs or arms are so situated with reference to the notches $f^4 f^4$ in said plate that they will strike the opposite ends of the respective notches as the bar G approaches the opposite ends of its travel, and so will cause the locking-plate to travel a short distance with the bar. This movement of the plate in opposite directions is made just enough to bring the ends of the plate-slots $f f$ into and out of the paths of the locking-shoulders on the indicator-rods. The notches $f^4 f^4$ are made of such length with reference to the lugs or arms $g$ $g$ that the bar G is allowed considerable movement before the notch ends are engaged. On the rear side of said bar are the two rearwardly-extending pins or studs $g'$ $g'$, playing in the longitudinal slots H H in the stationary frame-bar $A^3$. The bottoms of these slots are so situated that the respective pins $g'$ $g'$ rest upon them when the bar G is down in its normal position. In each of these slots there is a switch allowing the pin $g'$ to pass along on the bottom or lower side of the slot as it moves in one direction and causing it to rise up above the slot bottom on its backward travel until the end of such travel is reached, when the pin will be free to drop down again upon the bottom of the slot. Such switch, as shown, consists of a spring I, attached to bar $A^3$, and having a portion $i$ projecting into the slot of such length that a passage for the engaging pin $g'$ is left between the ends of such portion and those of the slot. One part of this portion of the spring is inclined downward and rests upon the lower side of the slot H, while the other part is horizontal and situated above the path of the respective pin $g'$ when the latter is down on the slot bottom. With this construction a pin, as it is carried by the movement of bar G out along the slot H and back again, will first pass horizontally along under the spring-switch, forcing it upward and passing out from under its end, and then on its back movement will ride up over the switch and drop down off of the latter to its original position, from which it started. The bar G, carrying the pins $g'$ $g'$, will then, as it is moved back and forth, travel in one direction in one path and in another direction in a higher path, from which it drops to the level of its lower path again. While traveling on its lower path the bar moves in such direction that its lugs or arms $g$ $g$, engaging the ends of notches $f^4 f^4$, carry the indicator-rod-locking plate F over into its inoperative position, with the ends of its slots $f f$ out of the paths of the locking-shoulders on the rods. Attached to the bar G is a spring K, adapted to draw it back again after it has been moved in the direction to trip the locking-plate F, as just described. Pivoted to the bar are the pendent pawls L, held rigid against swinging in the direction of the plate-tripping movement of the bar, but free to swing in the other direction. As shown, each pawl has for thus holding it from swinging a shoulder or short arm $L'$, engaging a stop on the bar G. Such stop is preferably made adjustable, so that the normal position of the lower end of the pawl can be adjusted at will. With this end in view each stop consists of a screw $L^2$, tapped down through a lug on the bar and locked as adjusted by means of a lock-nut $L^3$.

In order that the bar G may be moved to trip the indicator-rod-locking plate F as any key-lever is raised to make an indication, so that any previously-raised indicator-rod may be dropped as another rod is brought up into indicating position, I provide the two levers M M—one for each sub-series of key-levers—pivoted upon the lower stationary frame-bar $A^2$, and having their lower arms in position to be engaged by the pins $d^4$ $d^4$ on the respective key-engaged swinging frames D D' D, and their upper arms adapted to engage the pawls L L on the bar G, so as to carry the latter along to its plate-tripping position as the frames D D' D are raised. The upper ends of such levers are below the paths of pawls L L as the bar G travels back along its upper path or line of movement when the pins $f^4$ $f^4$ are riding up over the spring-switches, as hereinbefore described.

In order that the separate or independent key-levers not in the two sub-series may operate the locking-plate-tripping bar as they are raised singly or together, two levers M' M', pivoted to the stationary frame-bar $A^2$, have their lower and outer ends in position to be engaged by said key-levers as the latter are raised. One lever M' has its end in the path of and adapted to be struck and raised by either of the two independent key-levers at the left of the series. An arm $M^2$ on the nearest pawl-engaging lever M engages such lever M', while the other lever M' has an arm $M^3$, adapted to engage and raise the lower arm of the other pawl-engaging lever M. Instead of this different arrangement of the pairs of levers, both pairs can of course be connected in the same way, the form of connection being either one of these shown.

In order that an alarm may be sounded each time that any key-lever is raised to its full height to make an indication or complete registration, the bar G is provided with a lug $g^2$. In the path of this lug, as the bar moves outward along its lower line of travel to trip the locking-plate F, is the end of the spring-retracted hammer-lever N, carrying a striker N', adapted to strike a bell or gong $N^2$ when the lever end has been moved outward by lug $g^2$ and the latter has passed off of it. As soon as the hammer-lever is released by the bar-lug passing off of its end, which action takes place just as the bar G reaches the end of its outward movement, and consequently just before a key-lever being raised reaches the upper limit of its travel, the said hammer-lever, drawn by its spring $N^3$, flies back and strikes the bell. The hammer-lever end stands in the path of the lug $g^2$ as the bar G travels outward, but is below such lug when the bar has risen and is moving back again. The bar G, as it reciprocates, is utilized to cause not only the movement of the locking-plate F and the sounding of the alarm, but also the tripping of the drawer or till lock. The ordinary form of such lock is shown at O, with a rod O' extending up from it, connected with a lever $O^2$, pivoted upon the upper stationary frame-plate $A^3$.

Pivoted upon the movable bar G is a third pendent pawl $O^3$, like pawls L L, already described, except that it is made yielding in the opposite direction and held rigid by the stop against pressure toward the left-hand end of the bar. Such pawl is adapted to strike the downwardly-projecting arm of lever $O^2$ as the bar G is moved outward to trip the rod-locking plate and actuate the alarm-sounding mechanism. As it moves the lever-arm along it causes, through the rod O', the latch or lock O to be tripped to release the drawer or till just as or after the alarm is sounded. The levers M M are so pivoted, and their pawl-engaging arms are of such length, that the ends of said arms travel down off of the lower ends of their respective pawls just as the levers reach the end of their swing, so that the bar G is then free to be drawn back by its spring K. The notches $f^4 f^4$ in the downwardly-turned front edge of locking-plate F are of such height as to allow free up-and-down movement of lugs or arms $g$ $g$ on bar G as such bar rises and falls at opposite ends of its longitudinal travel.

Journaled upon the shaft P, which is supported in suitable bearings on the plate $A^4$, attached at its ends to the frame-plates A A, are the register-wheels for registering the amounts indicated by the movements of the different keys. To provide for the setting of the wheels back to zero, the shaft is made rotary and longitudinally movable and has a series of pins or studs (not shown) adapted to be brought by the longitudinal movement of the shaft into and out of position to engage shoulders or pins on the various wheels as the shaft is rotated. I have not shown these pins on the shaft and shoulders on the wheels, as their arrangement and operation will be fully understood to those familiar with registering mechanism.

For each swinging frame C C' C, carrying a toothed pawl C³, as already described, there is a series of three register-wheels P' P² P³. To the wheel P' is attached a ratchet-wheel P⁴, adapted to be engaged and turned by the respective toothed pawl. The graduation and markings of the wheels need not be described herein, as they can be varied as desired. They should be so arranged that as the respective frame C C' C is moved through different distances by the engaging keys the proper different registrations will be made, the required marked divisions being brought to or opposite a suitable index or display-slot. Each wheel is provided with a series of teeth $p\ p$, one for each numbered or marked division on the respective wheel. The teeth on wheel P' are preferably made ratchet-shaped. Spring-pawls $p'\ p'\ p'$—one for each wheel—engage the teeth on the wheels, so as to prevent too rapid turning or accidental back movement of the latter. Besides the teeth $p\ p$, each wheel P' and P² has a single tooth or lug $p²$ standing to one side of the series of teeth $p\ p$. Such tooth is the usual one for actuating the carrying device employed for carrying or continuing the registration from one wheel to another. Instead, however, of using a long-toothed carrier-pinion adapted to be engaged by the single tooth on one wheel and meshing with the series of teeth $p\ p$ on the next wheel, so as to turn the latter wheel one tooth at every complete revolution of the former, I prefer the special carrying or transferring device shown in the drawings.

Journaled upon a short shaft P⁵, arranged above each of the series of register-wheels P' P² P³, are the two angle-levers, each consisting of the sleeve or hub P⁶ and the two arms P⁷ P⁸, projecting radially from the hub at angles to each other. The arms P⁷ on the two hubs or sleeves are in position to be engaged, respectively, by the single teeth on the wheels P' P². Pivoted to the other arms P⁸ P⁸ are the pawls P⁹ P⁹, each adapted to engage the teeth $p\ p$ on the wheel next to the one carrying the single tooth which engages the arm P⁷ of the respective hub or sleeve. With this construction, as the arm P⁷ of one of the hubs or sleeves is engaged and moved along by the single tooth $p²$, the hub is rotated, and arm P⁷ is swung so as to draw pawl P⁹ along to cause turning of the next wheel through the distance of one tooth or division.

Attached at one end to the top of each hub P⁶ is a spring P¹⁰, whose outer end rests upon the outer end of the respective pawl B⁹. With the spring so arranged, as the hub is rocked by the movement of arm P⁷ the spring is put under stress, being forced down upon the pawl. It then holds the latter down in engagement with the teeth $p\ p$ on the register-wheel and exerts a back-pressure upon the hub in a direction to turn it back to its original position when the arm P⁷ has passed off of or out of engagement with the single tooth $p²$. The result is, that as soon as such tooth has passed the arm P⁷ the hub rotates quickly back to its normal position, the arm P⁸ being moved so as to carry the attached pawl over the wheel-tooth $p$ next to the one just engaged. To facilitate the riding of the pawl up over such succeeding tooth the outer or rear side of the pawl is beveled or inclined, as shown at P¹¹. The outer end of the spring P¹⁰ is preferably hooked over the pawl end and bears in a groove P¹² on the pawl, so that it is not liable to get out of place. For the two independent key-levers at the left of the machine there are only two register-wheels— one for each lever—and consequently no carrying or transferring register device is needed in connection with them.

In order to prevent overthrow of the register-wheels, and so overregistration, if any key-lever should be actuated quickly, I provide a brake for locking each ratchet-wheel P⁴ as any key-lever raises the swinging frame D D' D to the end of its full upward swing. Such brake consists of a swinging pawl-lever R, pivoted to plate A⁴, and having its nose adapted to engage the teeth on the first register-wheel P' of the respective series of wheels when the pawl-lever is swung upward. Each pawl-lever is pivotally connected between its nose and fulcrum with a vertically-sliding bar R', guided on plate A⁴ by means of screws R² R² on the plate engaging slots R³ R³ in the bar. Springs R⁴ R⁴, attached to plate A⁴, and each pressing against one of the pawl-levers, serve to hold it by friction in any position into which it may be moved. On each bar R' is an abutment or bearing adapted to be engaged and lifted by the respective frame D D' D as the latter reaches the upper limit of its swing. Such lifting of the abutment and bar raises the pawl-nose up into engagement with the teeth on wheel P', so as to stop the wheel and hold it from rotation. The friction-spring R⁴ then retains the pawl-lever in its wheel-locking position after the frame D D' D has descended below and released the shoulder on the sliding bar. Extending down from said bar R' is an arm R⁵, having a projection R⁶, adapted to be engaged and carried downward by the frame D D' D as the latter reaches its normal lower position again. The resulting downward movement of the bar R' draws the pawl-lever R out of engagement with the teeth of the register-wheel, so as to leave such wheel free to be turned as any key is subsequently raised. The abutment or bearing on the bar, which is engaged by frame D D' D on its upward movement, I preferably make adjustable and in the form of a screw R⁷, tapped down through a lug on the bar R'.

The operation of my apparatus, as shown and described, is as follows: As any key-lever is operated to make an indication and registration the corresponding indicator-rod is raised up toward its indicating position. If the key-lever is in one of the two sub-series, it raises during its upward movement the respective frame D D' D, so as to swing one of the levers M M over to the right. If it is one of the three separate independent levers, it engages one of the levers M' M' and moves it so as to swing the respective lever M in the same direction in which it would be swung by the frame D D' D, as described just above. This movement of one of the levers M causes such lever to engage the respective pawl L on the bar G and force the latter one to the right. The lugs $g\ g$, engaging the ends of the notches $f^4 f^4$ in the indicator-rod-locking plate F when the bar is near the end of its travel, force the plate along, so as to take the ends of its slots $f\ f$ out of the path of the shoulders on the indicator-rods and cause any previously-raised indicator-rod to be released by the plate and allowed to drop down to its normal position, resting upon its operating key-lever. As the bar G reaches the end of its movement to the right under the influence of the actuating-lever, the bar-lug $g^2$, which has engaged and swung the bell-striker lever against the stress of its spring, passes off of the end of such lever and the spring swings the latter quickly to cause it to strike the bell. The pawl $O^3$ then, having engaged the drawer or till bolt tripping lever, swings it to cause the bolt or latch to release the drawer or till. As the bar-moving lever reaches the limit of its swing to the right its end passes down off of the engaged pawl L and the released bar is drawn quickly back to its original position by its spring K. On its backward travel the bar-lugs $g\ g$ engaging the left-hand ends of the notches $f^4 f^4$ in plate F throws such plate quickly back to the left, so as to bring the end of the slot $f$, through which the indicator-rod just raised passes, under the locking-shoulder on such rod. As the plate-actuating bar returns to its normal position it is caused by the engagement of its pins $g'\ g'$ with the spring-switches I I to take an elevated path, so that its lug $g^2$ clears the end of the bell-striker lever and its pawls L L pass above the tracks of the upper ends of the bar-moving levers M M. The bar will then always be free to be drawn back by its spring to carry the plate H into its normal indicator-rod-locking position whatever the position of one of the levers M M may be. With this construction the partial raising of a key in one of the sub-series will not cause any interference with the proper operation of the bar G if a key in the other sub-series or one of the independent keys should be fully raised to make a complete registration and indication. After having passed back along its elevated track the bar G drops down again as its pins pass off of the ends of the spring-switches. As indicated hereinbefore, the points at which the levers M M will engage and pass off of pawls L L can be adjusted by turning the adjusting-screws $L^2 L^2$ up or down. The time of tripping the drawer or till lock can be regulated in the same way by turning the pawl-adjusting screw. As the notches $f^4 f^4$ in plate F are much longer than the width of the lugs, the plate is only actuated as the bar approaches the opposite ends of its travel and the rest of the time remains stationary in the positions into which it has been moved. A raised rod is then not released and dropped by the tripping of the plate F until a key has been moved far enough to nearly raise its respective indicator-rod to its full height for an indication. As the movement of the key is continued for a short distance after the tripping of the plate, so as to bring its locking-shoulders above such plate, the bar G, being released from the lever which has tripped it, flies quickly back under stress of its spring, and with a quick blow drives the locking-plate into its rod-locking position. The levers M M, after they have been actuated, as described, and released, swing back into their normal positions again, their upper ends riding under the pawls L L, which swing easily as the lever ends engage them upon the return movements of the levers. As any key of the two sub-series is raised to make an indication it engages the graduated bar C' of the respective register-actuating swinging frame, and, raising such frame a distance inversely proportional to the distance of the bar-edge from the key, causes the toothed pawl $C^3$ to turn the respective ratchet-wheel $P^4$ to rotate the register-wheel P' through a certain predetermined number of spaces, according to the amount of movement of the pawl-carrying frame. As the frame D D' D is also raised by the key it strikes the adjustable bearing or abutment on sliding bar R' just as the frame and consequently the key approach the limit of their full upward movement, and lifting such bar raise the brake-pawl R up into engagement with the teeth $p\ p$ on wheel P', so as to lock such wheel just as the raising of the key is completed. As the key and frames C C' C and D D' D descend again, and the toothed pawl $C^3$ rides down over the teeth of the ratchet-wheel, the brake-pawl is retained in position to prevent any rotation of such wheel and wheel P' by the spring $R^4$ bearing against the side of the pawl or pawl-lever until the frames and key are near their normal depressed positions, when the frame D D' D, engaging the lug $R^6$ on arm $R^5$, draws the bar down, and so disengages the brake-pawl from the wheel-teeth. As the wheel P' makes a full revolution its tooth $p^2$ engages the arm $P^6$ on hub $P^5$ and carries it with it. This moves the pawl $P^9$, so as to turn the wheel $P^2$, whose teeth it engages through one tooth. As the sleeve or hub $P^6$ is rocked over toward the pawl $P^9$ the spring $P^{10}$ is put under stress, so that as the tooth $p^2$ passes from under arm $P^7$ the hub is, by the force of the spring, turned back to its normal position again, carrying the arm and the pawl pivoted thereon rearward. As the pawl is thus moved the inclined face on its rear side, engaging the tooth $p$ next to the one just engaged, causes the pawl end to fly up over such succeeding tooth, down behind which it then drops. The second hub, with its arms, pawls, and spring, operates in the same way in connection with the two wheels $P^2 P^3$, so as to turn the latter wheel one tooth for each full-revolution of the former. By means of the screw-adjusted pawls the dropping of a raised indicator-rod and sounding of the alarm and the unlocking of the drawer or till can be relatively timed as desired. As the movements of the tablet-carrying rod-locking plate, the actuation of the alarm-striking lever, and the tripping of the latch or bolt are all caused by the motion of one piece—viz., the bar G—they cannot take place out of the order or out of the relative arrangement as to time to which they may be adjusted.

With my alarm-sounding, indicator-rod locking and unlocking, and drawer-lock-tripping mechanisms arranged and operated, as described, by the movements of the levers M M, it will be observed that I do away with the usual heavy swinging frame extending across the whole series of keys used heretofore to trip the drawer-lock, alarm-striking lever, and indicator-rod-locking plate or bar. The keys of each sub-series have merely the two light frames C C' C and D D' D to raise, while the other separate keys have only their arms $C^5$ $C^5$ and the levers M' M' to move in order to cause the full operation of the machine to make the desired registration and indication and unlock the drawer or till.

Having thus described my invention, what I claim is—

1. In an indicating mechanism, in combination with a series of indicator-rods provided with locking-shoulders, the locking-plate for engaging such shoulders and a movable bar or piece adapted to move the locking-plate into and out of its rod-locking position, substantially as and for the purpose specified.

2. In an indicating apparatus, in combination with the shouldered rods and the locking-plate therefor, a movable bar and connections between such bar and the locking-plate, whereby the bar at opposite ends of its movement moves the plate in opposite directions, substantially as and for the purpose shown.

3. In an indicating apparatus, in combination with the shouldered rods and the locking-plate therefor, a movable bar, a spring drawing such bar in one direction, and suitable connections between the plate and the bar whereby the latter, as moved to put the spring under stress, moves the locking-plate out of operative position and on its return movement by the spring moves the plate into locking position, substantially as and for the purpose set forth.

4. In combination with the rod-locking plate, a movable bar, a spring forcing such bar in one direction, an arm on the bar, and shoulders on the plate adapted to be engaged by the arm on the bar as such bar approaches the opposite ends of its travel, substantially as and for the purpose described.

5. In combination with the movable bar provided with one or more arms, the rod-locking plate provided with a notch for each of the rod-arms and a spring forcing the bar in a direction to carry and hold the plate in rod-locking position, substantially as and for the purpose specified.

6. In combination with the bar provided with one or more arms, the indicator-rod-locking plate provided with one or more notches made wider than the arm or arms on the bar, a spring drawing the bar in one direction, and means for forcing it in the other direction, substantially as and for the purpose shown.

7. In combination with the indicator-rod-locking plate and the spring-retracted bar, connections between the plate and bar whereby the latter moves the former as it approaches the ends of its movement in opposite directions, a pawl on the bar, and a lever adapted to engage such pawl, so as to force the bar over against the stress of the spring and then let it fly back again, substantially as and for the purpose set forth.

8. In combination with the spring-retracted bar having one or more arms, the indicator-rod-locking plate having one or more notches for the arm or arms on the bar, a pawl on the bar, and a lever to engage such pawl, substantially as and for the purpose described.

9. In combination with the indicator-rod-locking plate and the bar for moving the same, connections between the bar and plate whereby the former as it is moved in opposite directions reciprocates the plate, a spring for moving the bar in one direction, an adjustable pawl on the bar, and a lever to engage such pawl, substantially as and for the purpose specified.

10. In combination with the drawer or till lock, the spring-retracted bar, means for moving the bar against the stress of the spring, a lever connected with the lock, and means on the bar for moving the lever, substantially as and for the purpose shown.

11. In combination with the drawer or till lock and the lever connected therewith, the spring-retracted bar and an adjustable piece on such bar for engaging the lever to cause the lock to be tripped, substantially as and for the purpose set forth.

12. In an indicating apparatus, in combination with the bar for moving the indicator-rod-locking plate into and out of locking position, an alarm-sounding mechanism and means carried by the bar for causing such mechanism to sound an alarm, substantially as and for the purpose described.

13. In an indicating apparatus, in combination with the shoulder-rods and the locking-plate therefor, the movable bar, connections between the same and the plate whereby the latter is moved into and out of locking position by the movements of the bar, an alarm-sounding mechanism, and means on the bar for actuating such mechanism as the bar moves the plate out of its locking position, substantially as and for the purpose specified.

14. In combination with the drawer or till lock and an alarm-sounding mechanism, a movable bar, connections between the same and both the lock and alarm-sounding mechanism whereby the lock is tripped and an alarm is caused to be sounded by movement of the bar, substantially as and for the purpose shown.

15. In combination with the series of indicator-rods and the locking device therefor, the till-lock and means for moving the same, and an alarm-sounding mechanism, the movable bar provided with means for tripping the rod-locking device, raising the till-lock, and actuating the alarm-sounding mechanism, substantially as and for the purpose set forth.

16. In combination with the indicator-rod-locking plate, the alarm-sounding mechanism, the till lock or bolt, and the lever connected therewith, the movable bar having means for moving the plate into rod-unlocking position, and also means for moving the bolt-lever and actuating the alarm-sounding mechanism, substantially as and for the purpose described.

17. In combination with the indicator-rod-locking plate having suitable shoulders for engagement by its actuating device, the drawer latch or bolt and means for raising the same, and the alarm-sounding mechanism, the movable bar having the arm to engage the shoulders on the rod-locking plate, a piece to engage the bolt-raising means, and a lug to actuate the alarm-sounding mechanism, substantially as and for the purpose specified.

18 In combination with the lever of the alarm-sounding mechanism, the movable bar having the lug to engage such lever as the bar moves in one direction and means for shifting the bar to take its lug out of line with the alarm-lever as the bar travels back again, substantially as and for the purpose shown.

19. In combination with the movable bar and a lever for moving the same in one direction, a pawl on the bar to be engaged by the lever, one or more pins on the bar, and switches to engage and guide the bar-pins along an elevated path as the bar travels back again and allow them to drop at the end of the backward travel of the bar, substantially as and for the purpose shown.

20. In an indicating apparatus, in combination with a series of keys and the levers moved through suitable connections with such keys, the reciprocating bar provided with pawls to be engaged by the levers as the latter swing in one direction, and with pins, a spring to retract the bar, and switches to engage and raise the pins and the bar as the bar is retracted, substantially as and for the purpose set forth.

21. In an indicating apparatus, in combination with the two series of keys and the frames engaging the keys of the respective series, the reciprocating bar provided with pawls and with the guide pins or studs, the two levers adapted to engage the pawls to move the bar in one direction, and the spring-switches guiding the pins and bar into and along an elevated path as the bar travels back, so as to carry the pawls clear of the tracks of the lever ends, substantially as and for the purpose described.

22. In an indicating apparatus, in combination with the series of shouldered indicator-rods and the reciprocating locking-plate therefor provided with one or more notches, the movable bar provided with one or more arms to engage the notch or notches in the locking-plate, and with guide-pins, a spring to retract the bar, pawls on the bar, swinging levers to engage the pawls, two series of keys, two frames adapted to be moved by any key in the respective series and to move one of the levers, and suitable switch devices to engage the bar-pins and cause them and the bar to travel in different paths as they move in opposite directions, substantially as and for the purpose specified.

23. In an indicating apparatus, in combination with the indicator-rods and keys for actuating them, levers for causing actuation of the indicator-rod-locking device and the alarm mechanism and levers adapted to be engaged by the keys and themselves engaging arms of the other levers, substantially as and for the purpose shown.

24. In an indicating apparatus, in combination with the separate sub-series of keys and the separate independent keys, a lever, and a swinging frame for each sub-series, such frame being adapted to be engaged by any key in the respective sub-series and itself engaging and actuating one of the levers, separate independent keys, levers adapted to be engaged thereby, and themselves engaging arms of the other levers, substantially as and for the purpose set forth.

25. In combination with the reciprocating bar, the stationary supporting bar or plate therefor having openings or slots, arms on the movable bar embracing the upper edge of the supporting-plate, and pins on the bar entering the plate-slots, spring-switches situated in such slots having the elevated portion, and the downwardly-inclined portion extending down into the track of the bar-pins, substantially as and for the purpose described.

26. In a cash register and indicator, in combination with the key-levers and the indicator-rods actuated thereby, registering mechanism operated by the different key-levers, means for locking the indicator-rods when elevated, an alarm mechanism, a movable piece for tripping such lock and actuating the alarm mechanism, levers for moving such piece, and swinging frames for actuating such levers engaged by the key-levers, substantially as and for the purpose specified.

27. In a registering mechanism, in combination with a toothed wheel, a movable brake having a nose to engage the wheel-teeth to lock the wheel, and a friction device for retaining the brake in its operative position, substantially as and for the purpose shown.

28. In a registering mechanism, in combination with a toothed wheel and the brake to engage the teeth of the wheel so as to lock the latter from turning, a friction-spring engaging such brake, adapted to retain it in engagement with the wheel-teeth until it is positively moved, substantially as and for the purpose set forth.

29. In a registering mechanism, in combination with a toothed wheel and a brake-lever having a nose to engage the teeth of the wheel, a friction-spring engaging the side of the lever, so as to retain it as moved into engagement with the wheel-teeth, while leaving it free to be positively moved out of engagement with such teeth, substantially as and for the purpose described.

30. In a registering mechanism, in combination with a toothed wheel, a swinging brake-pawl adapted to engage the teeth of the wheel so as to lock the latter, a slide connected with the pawl so as to move the same into and out of engagement with the wheel-teeth, and a friction device to retain the pawl as moved into or out of operative position, substantially as and for the purpose specified.

31. In a registering mechanism, in combination with a toothed register-wheel, the pivoted brake-pawl, the slide for actuating the same connected therewith, and the friction-spring engaging the side of the pawl, substantially as and for the purpose shown.

32. In a registering mechanism, in combination with a toothed register-wheel, the brake-pawl, the friction-spring engaging the same, and the pawl-actuating slide connected with the pawl and carrying two shoulders or bearings to be struck by a movable piece for actuating the slide, substantially as and for the purpose set forth.

33. In a registering mechanism, in combination with a toothed register-wheel, a key, and connecting devices between the key and wheel whereby the latter is turned as the key is moved, a movable piece actuated by the key, the brake-pawl adapted to engage the teeth on the wheel, a friction-spring engaging the pawl, and a slide connected with the pawl so as to actuate it, and provided with two bearings or shoulders to be struck by the movable key-actuated piece as the latter moves in opposite directions, substantially as and for the purpose described.

34. In a registering mechanism, in combination with a series of keys and a toothed register-wheel, connections between the wheel and the keys whereby the wheel is moved as any key is raised, a brake-pawl adapted to engage the teeth on the wheel, the friction-spring engaging the pawl, a swinging frame extending across above the keys, and a slide connected with the pawl, having bearings or shoulders arranged above and below the frame, substantially as and for the purpose specified.

35. In combination with a toothed register-wheel, a series of keys, and means for actuating the wheel as any key is moved, the brake-pawl, the friction-spring engaging the same, a swinging frame extending across the series of keys, and the slide connected with the pawl, having the adjustable bearing to be struck by the frame just as a key finishes its upward movement and a shoulder or bearing below the frame to be struck by the latter on its downward movement, substantially as and for the purpose shown.

36. In a registering mechanism, in combination with a toothed register-wheel, a series of keys, a frame adapted to be moved different distances by the different keys, and connections between such frame and the wheel whereby the latter is caused to turn by the rising of the frame, a second frame moving with any raised key, a brake-pawl to engage the wheel-teeth to lock the wheel from turning, a friction device to retain such pawl as moved into or out of engagement with the wheel-teeth, and a slide connected with the pawl, having the bearings to be engaged by the second frame arranged above and below such frame, substantially as and for the purpose set forth.

37. As a means for moving a toothed wheel or other device, in combination with a rocking piece and a pawl carried thereby, a spring engaging the pawl and rocking piece so as to be compressed or put under greater stress as the rocking piece is moved to actuate the pawl, substantially as and for the purpose specified.

38. As a means for turning a toothed register-wheel, a rocking piece, a pawl for engaging the teeth on the wheel, pivotally connected with the rocking piece so as to be moved to turn the wheel as the piece is rocked, and a spring bearing upon the pawl, attached to the rocking piece so as to be forced toward the pawl as the piece rocks to move the pawl forward, substantially as and for the purpose described.

39. In combination with a wheel having a tooth or projection and a second wheel having a series of teeth, a rocking piece having an arm in the path of the tooth on the first wheel, a pawl pivotally connected with the rocking piece so as to be moved thereby and adapted as moved in one direction to engage the teeth on the second wheel and ride over the same as moved in the opposite direction, and a spring bearing upon the outer end of the pawl, attached to the rocking piece so as to be forced toward the pawl as the piece rocks, substantially as and for the purpose specified.

40. In combination with a wheel provided with a tooth or projection and a second wheel provided with a series of teeth, the rocking piece provided with the two arms, of which one is in the path of the tooth on the first wheel, a pawl pivoted to the other arm and engaging the teeth on the second wheel, and a spring bearing upon the pawl and attached to the rocking piece so as to be forced toward said pawl as the piece is rocked to cause the pawl to turn the second wheel, substantially as and for the purpose set forth.

41. In combination with a wheel provided with a tooth or projection and a second wheel provided with a series of teeth, a rocking piece having the two arms, one in the path of the tooth on the first wheel, a pawl pivoted to the other arm and having its nose for engaging the teeth on the second wheel, adapted as the pawl is drawn in toward the rocking piece to engage the wheel-teeth to turn the wheel and having its outer side inclined, a spring attached at one end to the rocking piece and projecting out over the pawl so as to be carried down toward the latter as the rocking piece is moved to draw the pawl inward and having its outer end, engaging the outer end of the pawl, hooked, substantially as and for the purpose described.

42. In a registering mechanism, the means for turning one register-wheel at each revolution of another, which consists of a tooth on one wheel, a series of teeth on the other wheel, a rocking piece having the two arms, the pawl on one of the arms having its upper side grooved, the spring engaging the groove in the pawl attached to the rocking piece so that it is forced down upon the pawl as the piece is rocked to draw the pawl inward and having its outer end hooked over the pawl end, substantially as and for the purpose specified.

In testimony that I claim the foregoing I have hereunto set my hand this 17th day of June, A. D. 1889.

ALFRED M. HARRISON.

Witnesses:
CHARLES H. KUMLER,
ALVIN W. KUMLER.